No. 733,840. PATENTED JULY 14, 1903.
W. H. HENDERSON.
HEATING DEVICE.
APPLICATION FILED FEB. 25, 1903.
NO MODEL.

Witnesses
C. H. Walker
Helen Royce

Inventor
Wm. H. Henderson
By Frank J. Appleman
Attorney

No. 733,840. Patented July 14, 1903.

UNITED STATES PATENT OFFICE.

WILLIAM H. HENDERSON, OF HILLSBORO, TEXAS, ASSIGNOR OF ONE-HALF TO J. W. HOWELL, OF HILLSBORO, TEXAS.

HEATING DEVICE.

SPECIFICATION forming part of Letters Patent No. 733,840, dated July 14, 1903.

Application filed February 25, 1903. Serial No. 144,936. (No model.)

*To all whom it may concern:*

Be it known that I, WILLIAM HOWARD HENDERSON, a citizen of the United States of America, residing at Hillsboro, in the county of Hill and State of Texas, have invented certain new and useful Improvements in Heating Devices, of which the following is a specification.

This invention relates to stoves, and particularly to an oven designed for use in connection with ordinary heating-stoves.

The object of the invention is to produce an oven in which the products of combustion—the smoke and heat—of an ordinary heating-stove, which usually escape to the smoke-uptake, are utilized, in their passage from the stove to the uptake, for cooking purposes.

Furthermore, the object of the invention is to produce an oven in which means are provided for causing the products of combustion to traverse a circuitous passage through the oven in order that the action of the heat on the oven may be prolonged.

Furthermore, the object of the invention is to produce an oven having double compartments for the reception of food and means for causing the circulation of the heating agent around both compartments.

With the foregoing and other objects in view the invention consists in the details of construction and in the arrangement and combination of parts to be hereinafter fully set forth and claimed.

In describing the invention in detail reference will be had to the accompanying drawings, forming part of the specification, wherein like characters denote corresponding parts in the several views, and in which—

Figure 1:
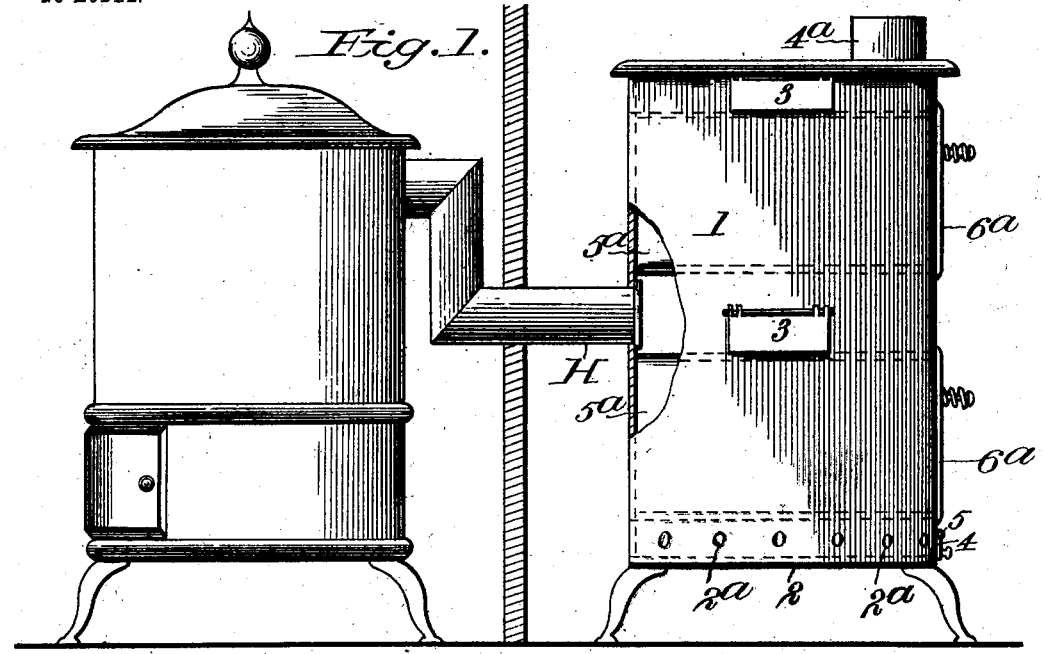
Figure 2:
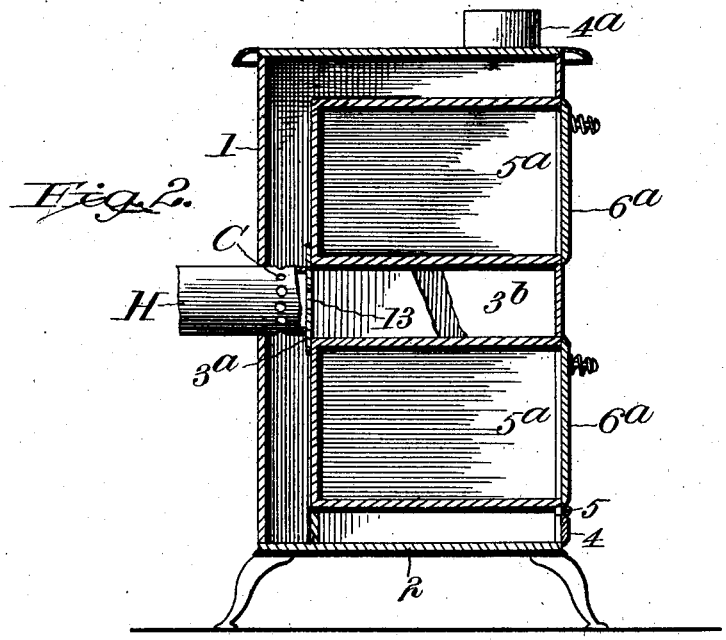
Figure 3:
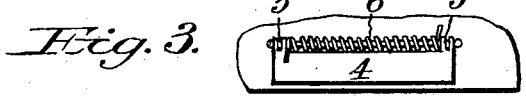

Figure 1 is a view in elevation, partly in section, illustrating an oven embodying the invention. Fig. 2 is a perspective view of a cooker embodying the invention. Fig. 3 is a detail view of a door.

In the drawings, 1 indicates a casing having a base 2, with perforated sides, the said casing having doors 3 to permit access to the interior for cleaning and a door 4 hinged at 5 and provided with a spring 6 for retaining door normally closed, said base having apertures $2^a$ for the admission of air to regulate the heat in the casing. Ovens $5^a$ are fixed in the casing and extend to the front thereof, said casing having doors $6^a$, whereby access is had to the interior of the ovens. Of course it will be apparent that one or more ovens may be used in a casing. The pipe $4^a$ is provided to receive a smoke-pipe.

As a means for distributing the products of combustion and in order to uniformly heat the interior of the casing, I may extend the pipe H against a rear wall $3^a$ and provide side walls $3^b$. A small aperture 13 in the wall $3^a$ will admit a percentage of the heat between the ovens by perforating the pipe as shown in C. The remainder of the heat passes out of the pipe in various directions between the casing and the wall, said heat passing through spaces between the ovens and between the casing and wall, thus affording the means for obtaining a maximum effect from the heat.

Having fully described the invention, what I claim as new, and desire to secure by Letters Patent, is—

In a heating device, a casing, ovens therein having their rear ends terminating a distance from the rear of the casing, an apertured wall between the ovens at the rear, a stovepipe leading through the casing and secured to the apertured wall, said pipe having holes at a point between the casing and its inner end.

In testimony whereof I affix my signature, in the presence of two witnesses, this 11th day of February, 1903.

WILLIAM H. HENDERSON.

Witnesses:
H. G. HART,
J. S. BOUNDS.